United States Patent [19]
Porter

[11] 3,881,871
[45] May 6, 1975

[54] MIXER FOR CONTINUOUS MIXING OF FOAM MATERIALS

[75] Inventor: Lawrence C. Porter, Palos Verdes Peninsula, Calif.

[73] Assignee: The Upjohn Company, Kalamazoo, Mich.

[22] Filed: Mar. 27, 1973

[21] Appl. No.: 345,253

Related U.S. Application Data

[63] Continuation of Ser. No. 85,580, Oct. 30, 1970, abandoned.

[52] U.S. Cl. .............. 23/252 R; 23/285; 23/288 E; 259/8; 259/44; 260/2.5 BC; 260/2.5 BD
[51] Int. Cl. ....... B02f 7/04; B01j 1/00; C08g 22/44
[58] Field of Search ................ 260/2.5 BD, 2.5 BC; 23/285, 252 R, 288 E; 259/5, 6, 7, 8, 41, 42, 43, 44

[56] References Cited
UNITED STATES PATENTS

| | | | |
|---|---|---|---|
| 2,957,203 | 10/1960 | Marshall | 259/7 X |
| 2,990,252 | 6/1961 | Geldern et al. | 23/252 R |
| 3,208,958 | 9/1965 | Jennings | 23/252 R |
| 3,232,709 | 2/1966 | Cole | 23/252 R |
| 3,482,822 | 12/1969 | Krizak et al. | 23/252 R |
| 3,674,720 | 7/1972 | Dunn | 260/2.5 BC X |

*Primary Examiner*—Joseph Scovronek
*Attorney, Agent, or Firm*—Denis A. Firth; John Kekich

[57] ABSTRACT

Methods and apparatus are disclosed for continuous mixing of formulations for urethane products. Substantially all of the components are supplied to a mixer which includes a preblend and a mixer section. In the preblend section, various chemicals are mixed in a selected sequence to provide a hydroxyl mixture which is continuously supplied to a mixer section where an isocyanate is added. In both the preblend and mixer sections, transverse shearing and agitation means are provided. The degree of agitation is varied along the length of the mixer, (which is operated at a constant speed) by varying the shearing pin configuration. The flow path through the mixer is arranged to control pressure on the fluid as well as minimize the tendency of internal foam build-up to occur. Means are provided to determine the swirl angle of the output and, hence, the vane inclination at the discharge. Thus, turbulence at the discharge is minimized. Different discharge means are illustrated for different formulations. The mixer provides versatility in inputs to accommodate various formulations including polyester and polyether hydroxyls. In alternative forms, means are provided for selectively controlling back pressure in the preblend and mixer sections, and the different discharge means include vane locations for controlling the acceleration of the fluids and a flared discharge opening for watery formulations.

18 Claims, 16 Drawing Figures

Lawrence C. Porter
INVENTOR

BY FIDLER & BARD

ATTORNEYS

Lawrence C. Porter
INVENTOR

BY  FIDLER & BARD

ATTORNEYS

MIXER FOR CONTINUOUS MIXING OF FOAM MATERIALS

This is a continuation of application Ser. No. 85,580, filed Oct. 30, 1970, now abandoned.

BACKGROUND OF THE INVENTION

This invention relates to improved methods and apparatus for producing urethane foam and the like and, more particularly, relates to improved methods and apparatus for continuous mixing of liquid reactants for the production of foam.

One of the techniques for the production of urethane foam is to continuously mix reactive materials while continuously pouring them. This, of course, involves the need for providing a continuous flow of reactive mixture from a discharge nozzle at suitable volumes with proper mixing and control over the ingredient inputs so that the deposited mixture reacts to provide an acceptable product.

In continuous molding of rigid foam, a reactive mixture is deposited on a moving conveyor at the input side of a tunnel mold and, as the reaction and foaming occur, the mixture expands and is defined in configuration by the cross-section of the tunnel mold and solidifies into a predetermined configuration. The quality of the resulting product is heavily dependent upon the quality of the mixing and control of the materials which are deposited for reception by the mold.

In continuous molding of flexible foam, a reactive mixture is deposited on a moving conveyor at the input side of a "U-shaped" form, and, as the reaction and foaming occur, the mixture expands and is defined by the cross-section of the form.

There are, of course, other types of foam molding other than with a continuously moving conveyor. In almost all instances, the mixing and its control are essential to the formation of a good product.

As noted heretofore, urethane foam products can be produced by a number of techniques and can be either rigid or flexible. The present invention is principally concerned with a mixer for high volume, short time and intimately mixed throughputs where substantially all of the chemical ingredients are supplied to the mixer, and thus control of the mix is greatly enhanced.

The raw materials used to produce foams typically consist of a di- or polyfunctional isocyanate, a polyfunctional hydroxyl material, a blowing agent, catalysts, cell size regulators, surfactants, and sometimes fillers or additives to obtain special properties. For the production of rigid foams, a relatively viscous hydroxyl compound is employed, and the objective is to obtain thorough mixing and dispersion of the various ingredients; the chemicals are such that about ninety percent of the cells in the foam product are closed. On the other hand, for flexible foams the polyester and polyether hydroxyl compounds are much less viscous, and the cells in the foam product are substantially all open. Obviously, viscosity of the chemical ingredients plays an important part in mixing and the likelihood of obtaining a thorough mixing action. Heretofore, the mixing head has been supplied with a preblended mixture of hydroxyl, catalyst, coloring and acid, which can interact chemically with one another but do not produce the foaming reaction. The other main mixture supplied to the mixer head was the isocyanate. Thus, the function of the mixing head was to blend the isocyanate and hydroxyl mixtures as quickly and thoroughly as possible to provide the reactive mixture. In this system, however, it was necessary to use the preblended mixture as soon after preblending as possible, since chemical reactions were occurring and, should there be an imbalance in the formulation, by the time a correction was made a considerable quantity of bad product was produced.

In U.S. Pat. No. 3,482,822, a mixing head is illustrated which has some features in common with the present invention. In the U.S. Pat. No. 3,482,822, a preblended hydroxyl mixture was combined with an isocyanate, and mixing of the isocyanate and preblended mixture were accomplished by intermeshing pins on the barrel and a whipper. This was highly satisfactory for certain formulations but lacks a control over the preblend mixture and does not provide sufficiently controlled mixing of faster reaction formulations. In any event, this head did not meet the entire set of problems posed by polyether and polyester compounds for flexible foam.

To mix compounds for flexible foam, heretofore it has been necessary to use a high pressure injection system for the ingredients in the order of 2,000 psi. The ingredients are injected into a mixing chamber through an injection nozzle system to provide a finely atomized, high velocity stream for mixing and dispersion purposes. This system obviously has drawbacks. With the present invention, relatively low pressure mixing of compounds for flexible foam is accomplished.

The mixing head can have outputs from 90 to 600 pounds/minute and typically traverses a moving conveyor at right angles while the liquid is laid down in a pattern of nearly parallel lines which merge before creaming. Upon mixing, the reaction begins immediately, and a foam rise can start at as little as 2 seconds after mixing (and even faster reactions are possible) and be completed within 1 or 2 minutes. Obviously, therefore, there is little time available for mixing. However, one of the most significant factors in producing good foam is proper mixing, particularly to handle dispersion of the vaporizing liquid and complex systems involving more than one reactant to obtain very highly cross-linked systems. A part of the difficulty in mixing the components for a urethane foam stock is the fact that some of the constituents are immiscible with one another, and others produce undesired reactions if not properly combined.

SUMMARY OF THE INVENTION

The advantages of the present invention are obtained principally with a mixer having a premixer section and a mixer section. The premixer and mixer have a cylindrical interior configuration and a central whipping means which jointly define an annulus for flow of constituents therethrough. The premixer provides for mixing of the hydoxyl with the various ingredients other than isocyanate and shortens the delivery time to the mixer of the hydroxyl mixture and isocyanate. The mixing is accomplished by transverse shearing members on a whipper body and the housing. By controlling the inputs to the flow path and the relative configuration of the whipping members, varying degrees of agitation or mixing are obtained along the flow path.

In the premix section, the resin (polyhydroxyl) is first introduced and passed to an expanding chamber. Various catalysts, surfactants, etc., are next injected and mixed into the resin. The mixture is continuously supplied to a mixer section where isocyanate is combined with the mixture in an expanding chamber. Thereafter, violent mixing of the isocyanate and resin mixture with one another is obtained by oppositely inclined, transvese blades in horizontal rows which straddle transverse pins in a housing, thereby transversely shearing and mixing the liquids. The oppositely inclined blades cancel out the turbine effect of the blades and also provide for a constriction and expansion of space between the turbine blades and the pins in the housing so that a thorough intermixing is obtained.

To produce varying degrees of mixing, a pin configuration which is cylindrically shaped is used for less violent mixing because a cylindrically shaped pin will generate a lesser amount of turbulence in mixing, and therefore a fairly mild mixing is initially performed. Subsequently, along the flow path, rectangularly shaped pins with their diagonals aligned with the axis of the whipper introduce an intermediate mixing intensity and, subsequent to this, square-shaped pins are employed to introduce a more violent degree of mixing before discharge of the materials from the mixer.

The configuration of the flow path is controlled to minimize internal foam buld-up, and discharge nozzles for various different formulations are illustrated. In one aspect of the present invention, the vane configuration of the outlet is determined by a reactive process in the mixer. For watery fluids, a dispersion nozzle arrangement is disclosed which minimizes the effect of splashing of the discharged fluids.

These and other features of the present invention will be further described or will become apparent in the following detailed description wherein reference is made to the figures in the accompanying drawings, as follows:

Figure 1:
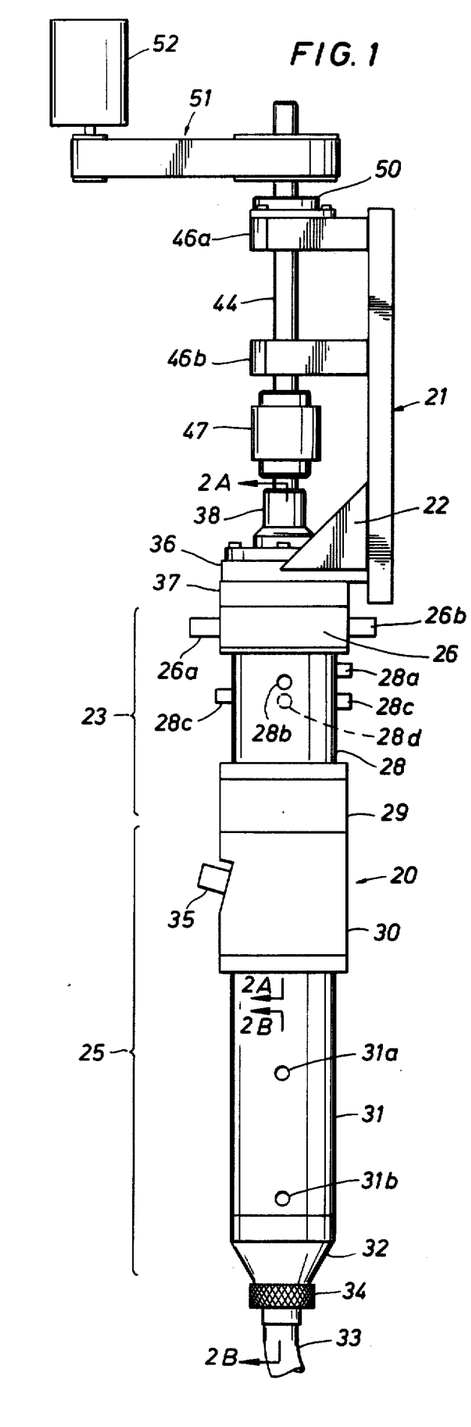
FIG. 1 is an overall view of a mixing head and mounting structure therefor in accordance with the present invention.

Referring now to FIG. 1, a mixing nozzle 20 is illustrated as attached to a mounting bracket 21 by a mounting means which includes triangularly shaped supporting blocks 22 welded to the bracket 21. The bracket 21 is, of course, adaptable for attachment to a traverse cradle or the like in a foam production system so that it may be moved transversely or vertically as desired. The mixer 20 generally consists of a premix or preblend section 23 and a mixer section 25. In the premix section is a port block 26 with supply conduits 26a and 26b, a premix or upper blending barrel 28 with a plurality of supply conduits 28(a–e), and a choke block 29. In most cases, all of the components for a foam mixture except for the isocyanate are supplied to the premix section for preblending.

In the mixer section 25 is a port block section 30, a mixer barrel 31, a barrel adapter 32 and a discharge nozzle 33 which is coupled to the barrel adapter by an adapter nut 34. In the port block section 30 is a supply pipe 35 for supplying isocyanate. In the barrel 31 are ports 31a and 31b which can be plugged or coupled to supply lines, as will hereinafter be more fully explained.

Figures 2A, 2B:
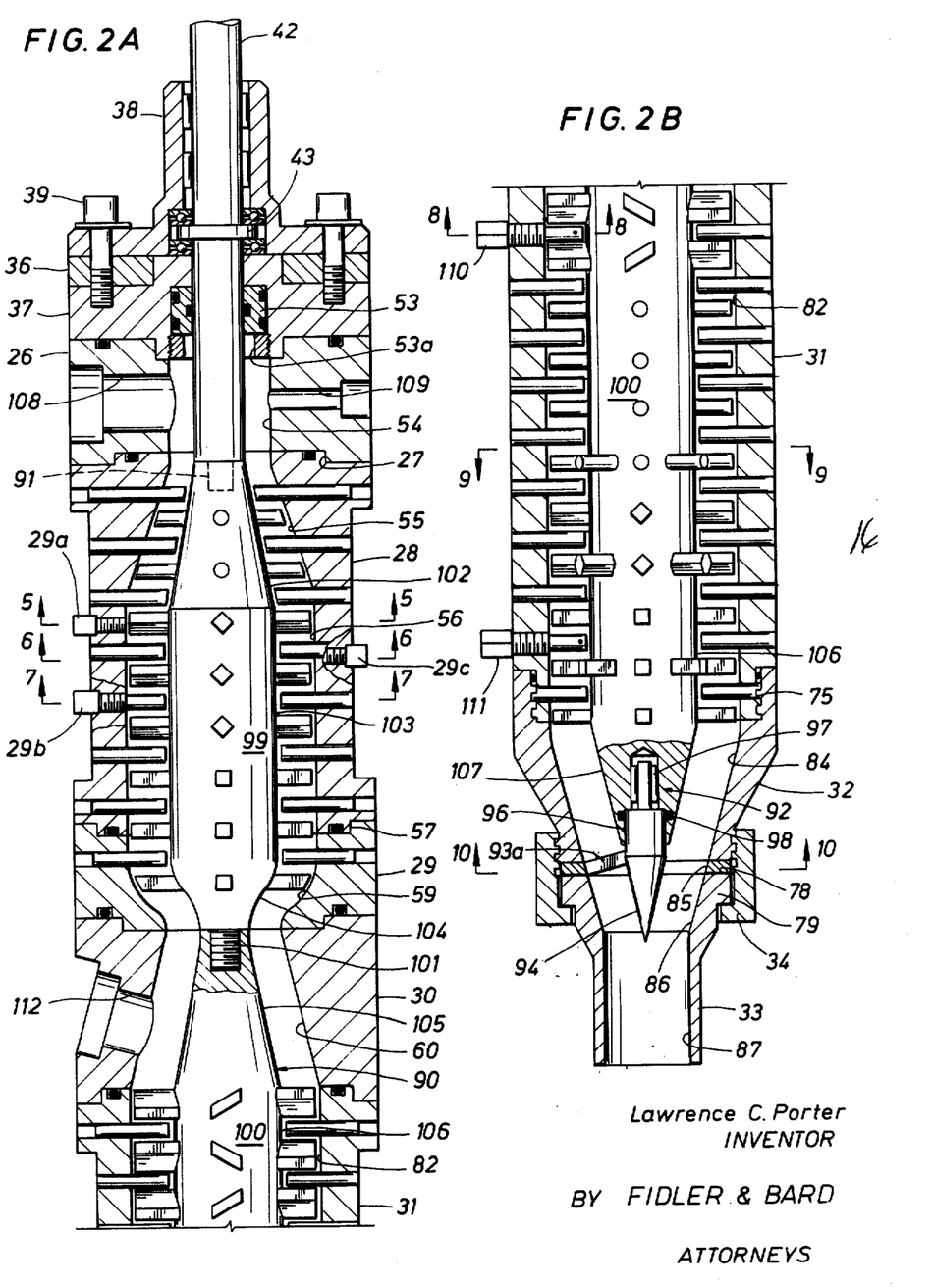
FIGS. 2A and 2B are views in cross-section taken along lines 2A—2A and 2B—2B of FIG. 1.

The mounting means includes the blocks 22 and a transverse block member 36 welded to the blocks 22. As shown in FIG. 2A, the block member 36 has a cylindrical opening which receives a cylindrical portion of a seal block 37. A depending cylindrical portion of the seal block 37 is received in a cylindrically shaped recess in the upper port block 26. A flanged portion of the seal block 37 is disposed between the block member 36 and the port block 26. An upper bearing housing 38 has a flanged portion fitting over the block member 36, and bolts 39 attach the bearing housing 38 to the upper seal block 37.

The bearing housing 38 has a central opening which receives a whipper shaft 42. In the housing 38 are thrust bearings and needle bearings for rotatively supporting the whipper shaft 42. A flange 43 on the whipper shaft 42 is disposed between the thrust bearings and is contained between the bearing housing 38 and the seal block 37 and prevents longitudinal movement of the whipper shaft 42. The needle bearings rotatively support the shaft relative to the bearing housing and provide longitudinal bearing supports for the shaft 42. A drive shaft 44 (FIG. 1) is supported by bearings in upper and lower blocks 46a and 46b attached to the bracket 21. The drive shaft 44 is interconnected to the whipper shaft 42 by a spline connected drive coupling 47. The drive shaft 44 has a flanged portion (not shown) which is supported between thrust bearings and contained by an upper bearing housing 50 attached to the upper block 46a. A pulley and belt arrangement 51 couples the drive shaft 44 to a variable speed motor 52 provided for supplying the motivating force.

The seal block 37 (FIG. 2A) has a central, stepped diameter opening which receives a seal member 53 for sealing the shaft 42 relative to the upper port block 26. The seal member 53 is held in place by an annular nut 53a threadedly received in block 37.

The upper port block 26 has a centrally located, cylindrically shaped opening 54. The lower surface of the upper port block 26 has a cylindrically shaped recess 27 which receives a pin on the upper surface of barrel 28, and an O-ring provides a seal between the surfaces. The barrel 28 has an outwardly extending conical surface 55 which merges with a larger diameter, cylindrically shaped surface 56. At the lower end of the barrel 28 is a depending pin 57 which is received in a cylindrically shaped recess in the upper surface of a choke block 29. In the choke block 29 is an inwardly curving surface 59 which extends inwardly to generally the same diameter as opening 54, where it has a reverse curved portion to match with a conical, outwardly extending surface 60 in the lower port block 30.

The lower port block 30 is shown disposed between the choke block 29 and the barrel 31. The lower port block 30 has a cylindrically shaped pin 67 which is received in a cylindrically shaped recess in the choke block 58. An O-ring seal is provided between blocks 58 and 30. The lower port block 30 has a cylindrically shaped recess 70 which receives a cylindrical pin 71 of the barrel 31. An O-ring is provided for sealiing blocks 30 and barrel 31 relative to one another.

The mixing barrels 28 and 31 and blocks 30, 29, 37 and 26 are interconnected by fastening means such as bolts (not shown). This modular constructon permits easy assembly, replacement and substitution of parts.

The lower end of the barrel 30 is threadedly coupled at 75 (FIG. 2B) to the barrel adapter 32, and the barrel adapter and the barrel are sealed with respect to one another by means of a suitable O-ring. At the lower end of the barrel adapter 32 is an annular support ring 78, and a flange 79 on the discharge nozzle 33 abuts the ring 78. A flanged adapter nut 34 engages flange 79 and is threadedly coupled to the barrel adapter 32.

With respect to the interior of the lower mixer section 25, the lower port block 30 has an outwardly diverging conically shaped wall 60 which is preferably at an angle of 17° with respect to the vertical, and the angle should be within the range of 15° to 20°. The conically shaped passage 60 extends to the lower part of the lower port block 30 where it merges with the larger diameter, inner cylindrical wall 82 of the mixing barrel 31. Wall 82 has a uniform diameter throughout the length of the mixing barrel 31. The barrel adapter 32 has an inner, inwardly diverging wall surface 84 which is complementary to the wall surface 85 of ring 78 and a tapered wall portion 86 of nozzle 33. Wall 84 connects to a cylindrically shaped discharge opening 87 for the nozzle.

To summarize the internal wall surface configuration of the mixer, it includes, in the preblend mixer portion 23, a cylindrically shaped opening 54, an outwardly extending tapered wall 55, a cylindrically shaped wall 56 and an inwardly extending wall 59 joined by reverse curves to walls 56 and 60. Wall 60 is outwardly diverging to the larger diameter cylindrically shaped wall 82 which, in turn, joins with inwardly diverging wall surfaces 84–86. A cylindrically shaped discharge passage 87 is jointed to wall 86. The overall configuration is such that the surfaces diverge and converge in each mixer section.

A whipper assembly 90 is received in the hollow chamber formed by the internal wall surfaces of the mixer. The whipper assembly, which is attached to the whipper shaft 42 by a threaded connection at 91, is supported for rotation by the upper bearing housing 38 at its upper end, and by a lower bearing assembly 92 at its lower end.

The lower bearing assembly 92 includes the ring 78 which carries three equidistantly spaced support arms 93(a–c) and a fairing member 94 with a conically shaped outer surface portion and a cylindrically shaped body portion 96. In the lower end of the whipper assembly 90 is a centrally located, stepped recess with a larger diameter opening slidably and rotatively receiving body portion 96, and needle bearings 97 in the opening rotatively mount the whipper assembly relative to the body 96. An O-ring 98 is located between the opening in the whipper assembly and body 96 to isolate the bearings and prevent build-up of foam product.

The whipper assembly 90 of the mixer includes a portion of shaft 42, an upper whipper part 99 and the lower whipper part 100. The lower whipper part 100 is threadedly coupled at 101 to the upper whipper part 99 which is disposed in barrel 28.

The upper whipper part 99 has an outwardly extending conically tapered outer surface 102 which begins at the upper end of the port block 28 and extends to the lower end of the port block. Preferably the angle of taper is 15° from the vertical and falls within a range of 13.5° to 19°, dependent upon the angle of wall 55. Coextensive with the wall surfaces 56 of the barrel 28, the part 99 has a cylindrical surface 103 so that an annular flow passage is formed along the barrel. The portion of the whipper part 99 which lines in the choke block 29 has an inwardly curved surface 104 which is similar to the curvature of wall surface 59.

With respect to the conical wall sections 55 and 102 in the upper end of the barrel 28, the angles are such that the cross-section is increased by a linear change to give a constant linear change in velocity of fluid flow. Similarly, the curved walls 59 and 104 are interrelated to provide a constant decrease in the cross-sectional area.

The outer wall surfaces of the whipper assembly 90 thus include the cylindrical surface of shaft 42, the outwardly tapered surface 102 of part 99, the larger diameter cylindrical surface 103 of part 99 and the inwardly curved surface 104. Between the inner surfaces of the mixer and the outer surfaces of the whipper part, an annular flow passage is defined which begins with a first cross-sectional area in port block 26, a second, expanding cross-sectional area in the tapered portion, a third larger cross-sectional area along the mixer barrel, and a fourth decreasing cross-sectional area in the choke block 29. Blades on the whipper, however, decrease the area along the mixer barrel. Insofar as the flow is concerned, it is desirable to have a uniform spacing between the inner walls of the mixer and the outer wall of the whipper assembly between the top of the mixer barrel 28 and the choke block 29.

In the mixer section defined principally by barrel 31, the lower whipper part 100 has an outwardly extending conically tapered surface 105 within and coextensive with the port block 30. The surface 105 joins with a larger diameter cylindrical surface 106 on the whipper which extends lengthwise along the mixer barrel 31. At its lower end, the cylindrical surface 106 joins with an inwardly tapered surface 107. Thus, a flow passage is defined in the lower mixer section which includes outwardly diverging flow paths. With respect to the conical wall sections 60 and 105 in the port block 30, the angles are similar to the angles of surfaces 55 and 102 so that there is a constant increase in velocity and an expanding cross-section. At the lower end of mixer section 25, the conical walls 84–86 and 107, 94 are converging, the angle of walls 84–86 being 15° and the angle of walls 107, 94 being 13° similar to the walls 55 and 102. The angles provide for a constant increase in velocity. Thus, between the upper mixer section 23 and the lower mixer section 25 the flow path is narrowed somewhat at the choke block 29 to provide backpressure to the flow of liquids therethrough. Similarly, in the lower part of mixer section 25 the flow path is somewhat restricted for increasing the output velocity of the liquid to the discharge nozzle.

The port block 26 has a perpendicularly arranged inlet port 108 through which a hydroxyl can be injected. Diametrically opposite to port 108 is another inlet port 109. Along the barrel 28 are injection ports 29(a-e) which will be more fully explained later. In the port block 30 is an isocyanate inlet 112 which is arranged normal to a line along surface 60. Along the barrel 31 are upper and lower inlet ports 110 an 111.

Figure 3:
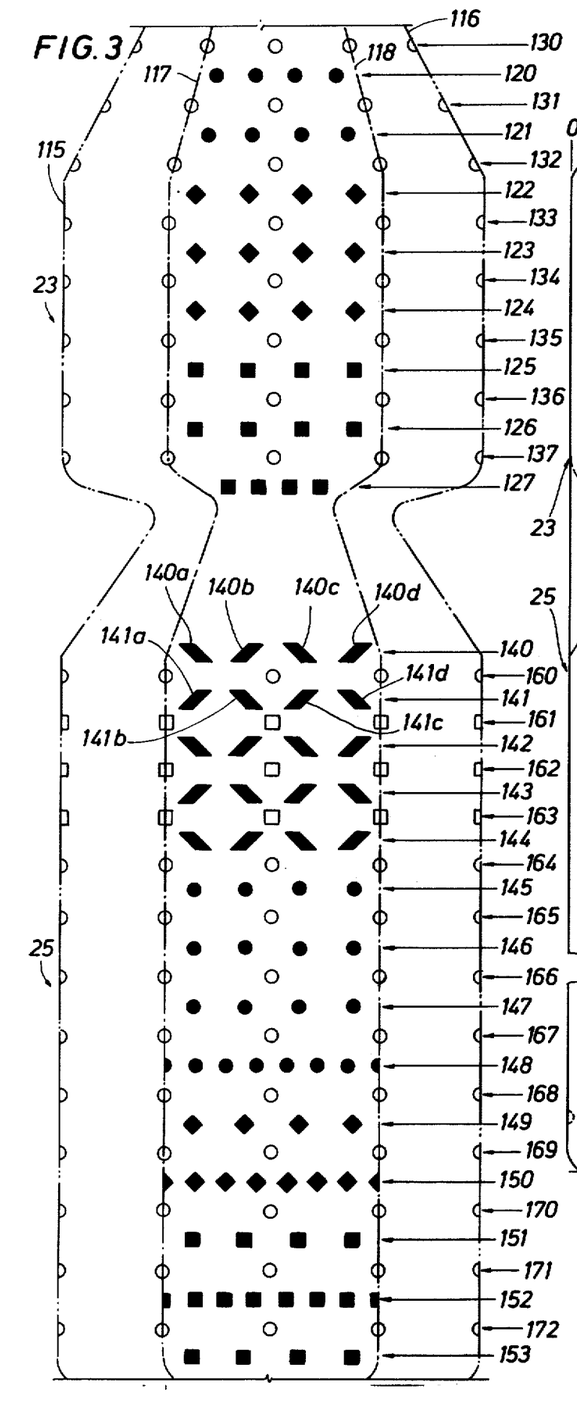
FIG. 3 is a plan view of the surfaces of the mixer and whipper body superimposed in the plane of the drawing.

Turning now to the mixer blade configuration, the whipper assembly 90 and the barrel 28, choke block 29, port block 30 and barrel 31 (hereinafter collectively referred to as the mixer housing) are illustrated in a plan view in FIG. 3, where the surfaces are laid out in the plane of the drawing for ease of illustration and explanation. In FIG. 3, the adjoining edge surfaces of the barrel 28, choke blocks 29, port block 30 and barrel 31 are illustrated by the dash-dot-dot lines 115 and 116. The adjoining edge surfaces of the whipper assembly 90 are illustrated by the dash-dot lines 117 and 118. There are various sets of whipper pins having different configurations and arrangements along the length of the mixer. For convenience of illustration, the pins on the whipper assembly 90 are depicted in a solid shade, while the pins on the housing of the mixer are depicted in outline form. Several of the pin sections are shown in FIGS. 5-9.

In the upper premixer section 23 are eight horizontal rows 120-127 of pins disposed on the whipper assembly 90. Each horizontal row of pins contains four pins equidistantly spaced around the circumference of the whipper assembly. As shown in FIG. 2A, the pins extend normal to the whipper assembly, i.e., the axis of each pin intersects the central axis of the whipper assembly, and each pin extends from the body of the whipper assembly to a point very close to the interior wall of the mixing housing. The pins of the first two rows 120 and 121 are cylindrical in cross-section. The pins of rows 122-124 are square shaped but are arranged with their diagonals parallel to the central axis of the whipper assembly 90. The pins of rows 124-126 are square shaped with two sides parallel to the central axis of the whipper assembly.

On the mixer housing are eight horizontal rows 130-137 of pins. Each horizontal row of pins contains four pins equidistantly spaced around the circumference of the mixer housing. As shown in FIG. 2A, the pins extend normal to the mixer housing, i.e., the axis of each pin intersects the central axis of the mixer housing, and each pin extends from the housing to a point very close to the wall of the whipper assembly. All of the pins are cylindrical in cross-section.

The rows of pins on the whipper assembly alternate along the length of the mixer with the rows of pins on the mixer housing, and the center-to-center spacing between horizontal rows is uniform.

In the mixer section, the whipper assembly 90 has, in longitudinal sequence, five horizontal rows 140-144 of pins which have a parallelogram shape in cross-section, four horizontal rows 145-148 of pins which have a cylindrical cross-section, two horizontal rows 149 and 150 of square shaped pins arranged with their diagonals parallel to the axis of the whipper assembly, and three horizontal rows 151-153 of square pins arranged with two side surfaces parallel to the axis of the whipper assembly. The rows 140-147, 149, 151 and 153 of pins each have four pins equidistantly spaced around the circumference of the whipper assembly. The rows 148, 150 and 152 of pins each have eight pins equidistantly spaced around the circumference of the whipper assembly. As shown in FIGS. 2A and 2B, the pins are normal to the whipper assembly, i.e., the axis of each pin intersects the central axis of the whipper assembly, and each pin extends from the body of the whipper assembly to a point very close to the interior wall of the mixer housing.

In the mixer section, the mixer housing has, in longitudinal sequence, thirteen horizontal rows 160-172 of pins. Each horizontal row of pins contains four pins equidistantly spaced around the circumference of the mixer housing. As shown in FIGS. 2A and 2B, the pins extend normal to the mixer housing, i.e., the axis of each pin intersects the central axis of the mixer housing, and each pin extends from the housing to a point very close to the wall of the whipper assembly. The pin of rows 160, and 164-172 are cylindrically shaped in cross-section, while the pins of rows 161-163 are square shaped in cross-section with two sides parallel to the central axis of the housing.

The rows of pins on the whipper assembly alternate with the rows of pins on the mixer housing and the center-to-center spacing between pins in the rows is uniform.

Referring back to horizontal rows 140-144 on the whipper assembly, the pins of each row form a blade and there are four blades in each row. Considering row 140, blades 140(a-d) each have end sides aligned parallel to the axis of the whipper assembly. The inclination of each blade with respect to a horizontal line is 30° with blades 140a and 140c pitched in an opposite direction to the pitch of blades 140b and 140d. Blades 140a and 140c are diametrically opposed, as are blades 140b and 140d. The opposite pitch cancels out the turbine effect of the blades. The blades 141(a-d) of row 141 are similarly arranged as the blades of row 140, except that the pitch of blades 141a and 141c is opposite to the pitch of blades 140a and 140c. Blades 141b and 141d are oppositely pitched relative to blades 140b and 140d. As illustrated, the relative pitch inclination of the individual blades of horizontal rows 140, 142 and 144 is similar with respect to corresponding, longitudinally aligned blades. The relative pitch inclination of individual blades of horizontal rows 141 and 143 is similar with respect to corresponding, longitudinally aligned blades. The effect of the pitch configuration is to make, for example, blades 140a and 141a converging and to make circumferentially adjacent blades 140b and 141b diverging. Thus, between each horizontal row of blades, circumferentially alternating converging and diverging flow paths are defined.

The significance of the pin arrangement may best be understood by comparing relative drag coefficients of 1.0 for round pins, 1.9 for square shaped pins turned to present a diagonal to the fluid and 2.8 for square shaped pins with sides parallel to the whipper axis. What this means is that the turbulence increases as the drag coefficient increases.

Figure 4:
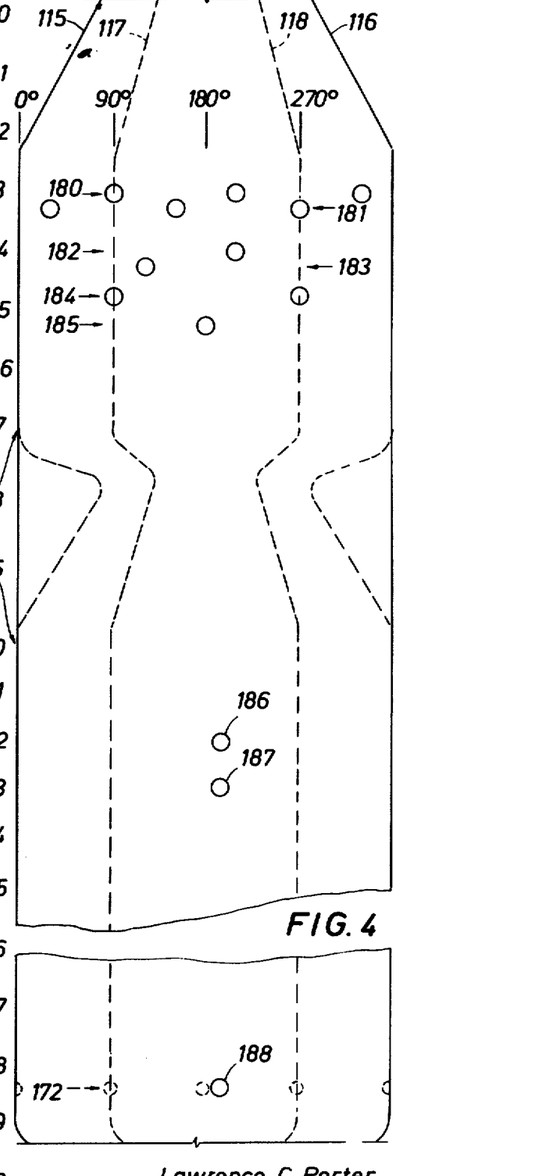
FIG. 4 is a plan view of the outer surface of the mixer for illustrating input ports.
Figure 5:
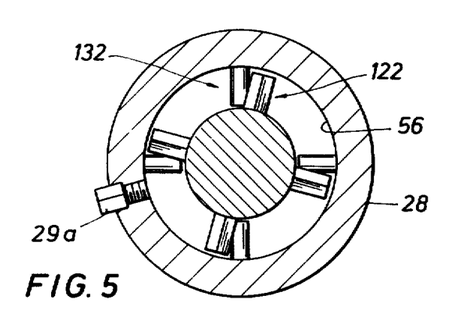
FIG. 5 is a view in cross-section taken along line 5—5 of FIG. 2A.
Figure 6:
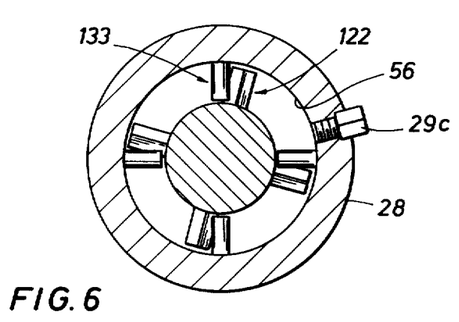
FIG. 6 is a view in cross-section taken along line 6—6 of FIG. 2A.
Figure 7:
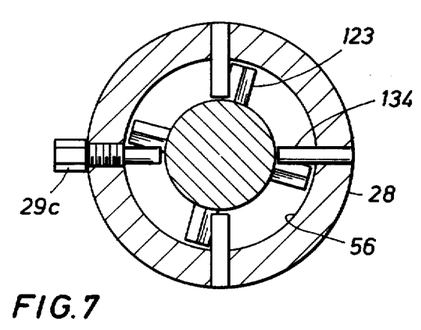
FIG. 7 is a view in cross-section taken along line 7—7 of FIG. 2A.
Figure 8:
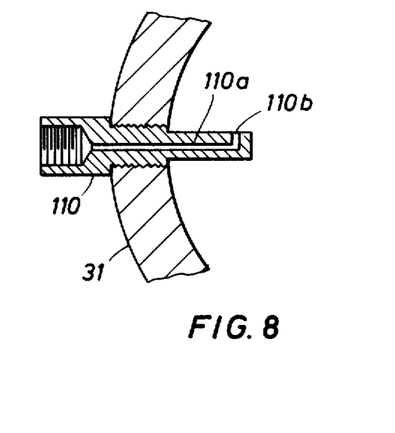
FIG. 8 is a view in cross-section taken along line 8—8 of FIG. 7 and FIG. 2B.
Figure 9:
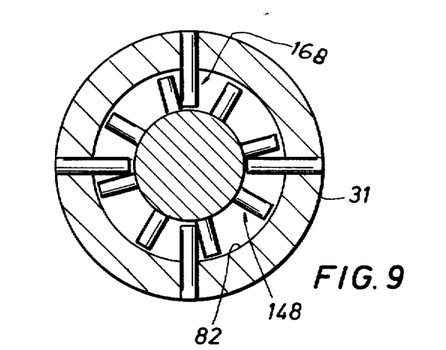
FIG. 9 is a view in cross-section taken along line 9—9 of FIG. 2B.
Figure 10:
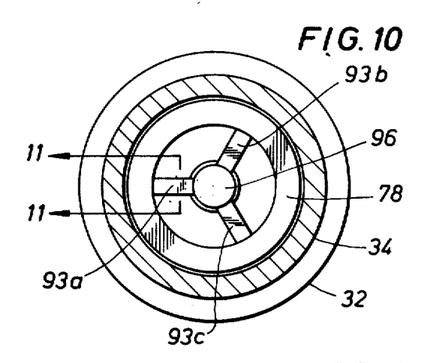
FIG. 10 is a view in cross-section taken along line 10—10 of FIG. 2B.
Figure 11:
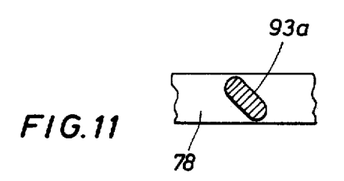
FIG. 11 is a view in cross-section along line 11—11 of FIG. 10.

Referring now to FIG. 4, the outer surface of the mixer housing is illustrated on a plane with the whipper assembly being shown in dashed line. In the premix section 23, around the circumference of the mixer housing are a series of tapped openings whch are circumferentially displaced as well as longitudinally displaced.

Some of the openings are in line with a horizontal row of whipper pins, some of the openings are in line with a horizontal row of housing pins, and some are located intermediate of the pin rows of the whipper and housing.

As shown typically in FIG. 2A, an opening 29a can be opposite to the ends of the pins on a row of whipper pins so that the ends of the pin tend to wipe the injected ingredient into the mixer. An opening 29b, on the other hand, can be a pin 110 (see FIG. 8) with an interior passage 110a and a perpendicular discharge port 110b aligned into the direction of rotation or away from the direction of rotation. An opening 29c can be disposed intermediate of adjacent rows of pins on housing and whipper to inject between the pins. Precisely which opening is selected is a matter of the formulation and the reaction. As shown in FIG. 4, there are several horizontal rows 180-185 of openings containing one or more openings placed as described heretofore. The openings which are not used are blocked off by threaded plugs.

In the mixer section 25 are longitudinally spaced openings 187 and 188 which are respectively located on a level with pin rows 162 and 163. In the lower part of section 25 is an opening 189 which is located on a level with pin row 172. The openings 187-189 may be blanked or receive fluid according to the dictates of formulation mixing, which will hereafter be more fully explained.

For the production of a rigid polyurethane foam according to the present invention, a typical formulation would include a hydroxyl compound or resin, methylene chloride, caster oil and water, coloring, silicone, an acid catalyst, nitrogen, Freon and an amine catalyst which would be mixed in the preblender and supplied to an isocyanate in the mixer. One of the problems solved by the present invention is the ability to inject Freon into the preblending operation and obtain satisfactory dispersion. This enables the Freon to be injected at higher temperatures and, thus, it is less likely to gasify or flash out during the mixing process. Generally speaking, it is desirable to introduce near the top level of the preblender those components which are more difficult to mix. In general, in the system the output should be basic, and with inputs which are acidic and basic it is necessary to balance out the system while getting the foam reaction initiated. In general, the levels of introduction are as follows: Freon is injected into the resin. At the top of the preblender and moving downward are methylene chloride, castor oil and water, silicone, acid catalyst, nitrogen and the amine catalyst. The coloring can be injected with the resin or along the preblend section. One of the additional advantages of the mixer of the present invention is the input of heat by mixing which decreases the amounts of chemicals added for generating the heat in the reaction. Also, with the immediate mixing there is little time for interaction between the chemicals in the preblender, so that less decomposition occurs and the control of the reaction is highly improved.

With respect to the production of flexible foam, a typical formulation includes, in addition to the hydroxyl or resin and isocyanate, a tin catalyst, water, silicone, Freon, air or hydrogen gas, color and fire retardant. It is desirable to introduce the fire retardant with the resin and, from the top downwardly in the preblend section, introduce the tin catalyst, water, silicone and air or hydrogen and Freon. By having a variable speed drive on the mixer, the relative degree of mixing can be controlled and very few air bubbles will be formed.

Relative to the construction of a mixer embodying the present invention, the overall internal diameter may be 3.25 inches and the outer diameter of the whipper may be 1.875 inches. It is desired to keep the diameter of the whipper barrel within 20 to 40 percent of the barrel diameter. The pin cross-section is 0.25 inch in diameter or length of side. For a 3-inch I.D. barrel, a 3/16 inch pin would be used, and for a 4½ inch I.D. barrel, a ⅜ inch pin would be used. The pins are welded in place or can be removably inserted by threaded connections. The spacing between adjacent pin centers on the housing and whipper is about 0.875 inch. This spacing desirably should be between 0.625 and 1 inch or 45° to 80° of the pin diameter. The clearance between adjacent pins should be on the order of 75 percent of a pin diameter. If the clearance is too great, the shearing action will not be effective. The restrictive area in the choke block should be sufficient to create a back-pressure of 50 to 60 psi. In general, the annulus defining the flow passage is a function of the viscosity of the fluids. That is, for higher viscosity fluids, the annulus should be larger than for lower viscosity fluids. The speed of rotation is similarly a function of viscosity, the more viscous fluids being agitated at lower speeds than the less viscous fluids. The surface defining the flow path are preferably hard flash chrome plated to avoid chemical reaction. The design of the flow path is arranged to minimize the tendency for an internal build-up of reacting foam. A typical temperature increase of 10° F. may be expected from the heat generated due to mixing. The blades of rows 140-145 may range from ⅛ × 3/16 to ⅛ × 5/16 inch for typical cross-section dimensions. In the design of port 108, it generally has the same cross-section as the annulus between the shaft 42 and opening 54.

The hold-up time through the mixer can be very short — as little as ½ of a second. This is typically determined by the input volume and the volume of the flow path.

In the operation of the foregoing described mixer, a resin mixture is injected through port 108 and feeds downwardly into an expanding area. The fire retardant in the case of flexible foams can be injected through port 109. The whipper assembly is rotated clockwise, and the shaft 42 is sealed with respect to the block 37 by means of the seal 53. The other ingredients for the preblend mixture are supplied via inlet openings along the length of barrel 28. In the choke block 29 the volume is somewhat reduced to provide a back-pressure. In the premix section the various ingredients are thoroughly mixed by the transverse shearing action of the pins, the degree of mixing increasing as the pin shapes vary along the length of the whipper. There is typically a short hold-up time in the premix section on the order of ¼ to 1 second, while the preblending is performed, and is followed immediately by mixing with the isocyanate. In the expanding area of port block 30, the isocyanate is introduced normal to the flow of the resin mixture and is fed downwardly by the resin into the blade mixer section where a violent mixing action occurs, the blades of each row being alternately pitched so as to avoid creating longitudinal hydraulic forces. Near the end of the blade mixer section, if necessary for the formulation, nitrogen and a vaporizable liquid can be introduced in the same direction as the direction of rotation. Following the blade mixer section, a relatively low action mixing section of round pins intermixes the resin and isocyanate. As will be appreciated, the blade section introduces a violent mixing action, and the lower action mixing section thus performs the function of reducing the mixing turbulence and stabilizing it somewhat. Following the round pin section, the mixing action is increased by the diagonal and square pin rows, and the mixture is passed to the converging flow path where the velocity of mixture is increased to maintain the density of the liquid and keep the vaporizable liquid in solution until at least after discharge from the nozzle.

With respect to the ring 78, it has three support arms 93(a-c) as noted heretofore. The support arms are thin in width as compared to thickness and are inclined at an angle with respect to the vertical. The shape of the arm is streamlined. The pitch angle of the arms is selected in accordance with the swirl angle of the fluids to minimize turbulence of the liquid as it is discharged. Typically, an angle of 20° is satisfactory for light fluids, while the angle for a highly viscous fluid might be 8°. The angle can be determined by use of port 188 where an excessive amount of catalyst is introduced and a reaction occurs in the mixer forming a swirl pattern on the housing. From the swirl pattern the swirl angle can be measured.

Summing up the features of the present invention, there is provided a continuous, streamlined flow path in which a first reactive hydroxyl is injected at a first inlet. Additives are injected and mixed continuously into the hydroxyl to form a hydroxyl mixture. A second reactive isocyanate is injected into the hydroxyl mixture flow in an expanding chamber. The reactive components are transversely sheared by meshing blades and pins where the blades have horizontally constricting and expanding areas and are inclined in opposite directions to offset forces on the liquid. Next, the mixture is passed to a comparatively less violent transverse shearing and mixing section comprised of alternating cylindrically shaped pins. Subsequently, the mixing section utilizes square-shaped pins oriented with diagonals parallel to the axis of the whipper assembly to increase the mixing action, and the mixing is finally completed by a further increase in the mixing action by use of square-shaped pins arranged with two sides parallel to the axis of the whipper assembly.

The mixing is accomplished in the premix section substantially along its length, while in the mixer section the mixing is performed in a section of the flow path having a substantially uniform annulus formed between the mixer barrel and the whipper body.

Figure 12:
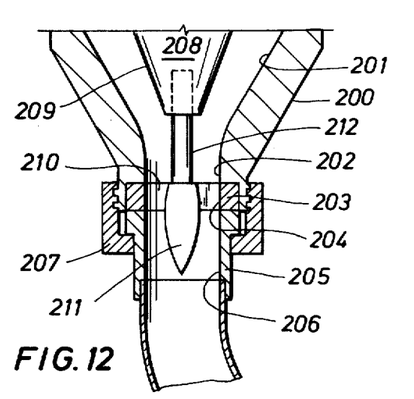
FIG. 12 is a view in cross-section of an alternative form of nozzle construction.

Referring now to FIG. 12, an alternative form of discharge is illustrated. In FIG. 12 an adapter 200 has an inwardly converging conical surface 201 and a lower cylindrical surface 202. An internal recess in the bottom surface of adapter 200 receives an annular ring 203 having a cylindrical surface 204. A discharge nozzle 205 with an inner cylindrical surface 206 abuts the ring 203. An adapter nut 207 is threadedly coupled to the adapter 200 and attaches the ring 203 and nozzle 206 to the adapter 200. The whipper 208 has an inwardly converging conical surface 209, the annular spacing between the whipper and adapter 200 being constantly decreasing toward the cylindrical opening 202. In the cylindrically shaped discharge opening 202, the ring 203 has three equidistantly spaced support members 210 which are attached to an ogive shaped part 211. Part 211 has an upwardly extending support pin 212 which is sealingly and rotatively received in the whipper 208.

The function of the ogive shaped tip is to promote acceleration of the fluids after they pass through the streamlined section. The continued acceleration provided by the ogive section avoids creation of turbulence and foaming in the nozzle for certain types of formulations. The ogive is used when the viscosity of a formulation is such that turbulence would cause a foam build-up in the nozzle. This is typically a fast reacting foam which is watery.

Figure 13A:
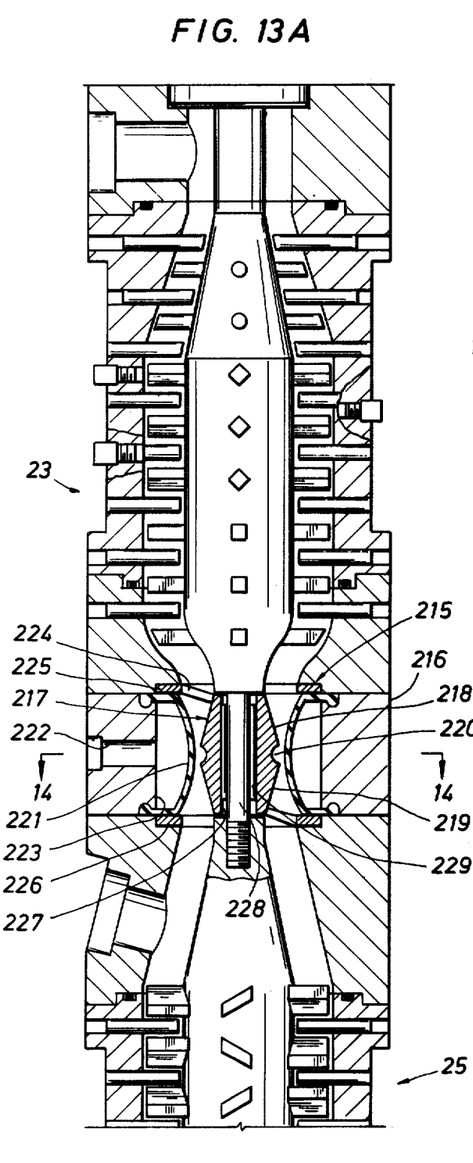
FIGS. 13A and 13B are views in cross-section of an alternative form of the present invention.
Figure 13B:
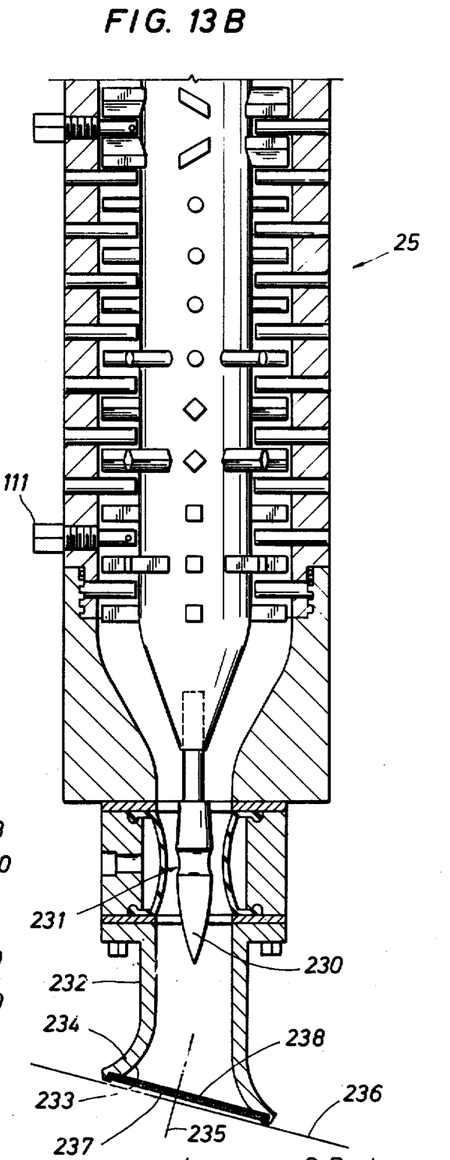
Figure 14:
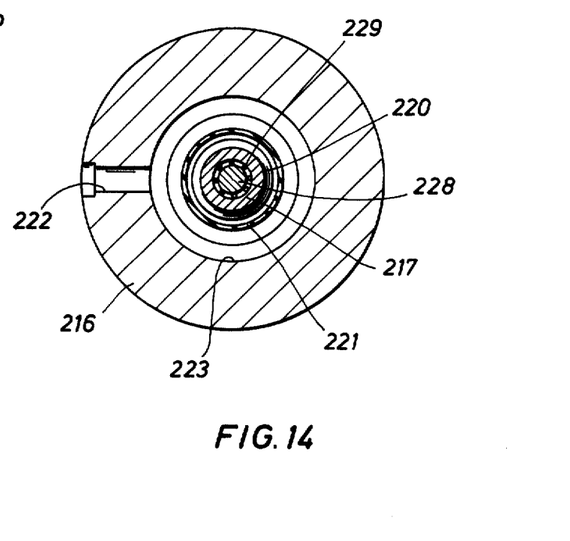
FIG. 14 is a view in cross-section taken along line 14—14 of FIG. 13A.

Turning now to FIGS. 13A, 13B and 14, a different form of mixer is illustrated. In this embodiment, the premix and mixer sections are similar to the sections described heretofore with respect to FIGS. 2A and 2B. Between the sections 23 and 25 is selectively operable valve 215 contained in a valve block 216. The valve 215 is comprised of a central spool member 217 having oppositely inclined outer surfaces 218 and 219. Surfaces 218 and 219 are conically shaped and, at the central apex formed by the surfaces, is a central, annular recess 220. Circumferentially disposed about the spool member 217 is a resilient sealing member 221 which is annular and has a reverse curvature to that of the spool member. The sealing member 221 is, of course, sealed with respect to a central opening 223 which extends through the valve block. An inlet port 222 opens to the central opening 223, and air or hydraulic pressure may be employed to control the position of the resilient diaphragm. With adjustment of the pressure on the diaphragm, the back pressure for the materials in the preblend may be controlled as desired or necessary. The spool member 217 may be attached by two or more arms 224 to an annular ring 225, and two annular rings 225 and 226 may be used to provide upper and lower supports. The spool member in this arrangement has a longitudinal opening 227 and bearings 229 which are received about a connector part 228 for the whipper. Hence, the spool member 217 is not rotated and does not subject the resilient diaphragm 221 to wear.

At the lower end of the mixer barrel, a similar valve may be employed to selectively control back pressure. The parts are similar to the valve 215 just described, except that the fairing member 230 has the annular sealing recess 231 disposed along its length. Thus, the valve can be selectively operated to control the back pressure of liquids in the mixer barrel.

A further refinement appears in FIG. 13B wherein the end of the discharge nozzle 232 has an outwardly flared opening 233. The flared opening 233 is formed by an outwardly flared section 234 which can have an exit diameter from two to six inches. The central axis 235 of the opening 233 is arranged normal to the plane 236 of an inclined conveyor. A wire mesh screen 237 is disposed across the opening of the flared horn section 234, and a porous membrane 238 such as a cheesecloth is disposed across the mesh. Since spattering or splashing of the mixture on a conveyor or in a mold is undesirable, use of a porous body at the discharge serves to disperse the liquid output more uniformly onto a conveyor or into a mold, and the flared horn provides a broader dispersion of the fluid. This feature has significance where the fluids are watery.

In summary of the foregoing apparatus and methods, there is an upper and lower hollow closed chamber defined by the various blocks and barrels. Rotatively mounted in the chambers is a whipper assembly which defines, in connection with wall surface of the chamber, a flow path or passageway. The flow path in the upper chamber includes an annular passage into which a resin is injected, an outwardly extending conically shaped passage which increases in cross-section from the annular passage to a second, larger diameter annular passage, and an inwardly extending curvilinear shaped passage which decreases in cross-section from the larger annular passage. In the upper chamber there are horizontal rows of pins, each row having pins equidistantly spaced about the circumference respectively of the housing and whipper. Each of the pins is disposed normal to the whipper axis, and each has a central axis intersecting the longitudinal axis of the whipper. The rows of pins extend alternately between the whipper and the housing lengthwise of the chamber. A pin typically extends from the chamber wall to a point adjacent to the wall of the whipper assembly, and the next longitudinally displaced pin is on the whipper shaft and extends outwardly to a point adjacent to the wall of the chamber. With respect to the pins on the whipper assembly, along the length of the assembly the pins are cylindrically shaped, then square shaped with their diagonals arranged parallel to the axis of the whipper assembly, and finally square shaped with sides arranged parallel to the axis of the whipper assembly. The sequence of different shaped pins serves the function of selectively increasing the mixing action from the resin input to the output at the curvilinear passageway Along the length of the chamber are various inputs of liquids to provide a preblended resin mixture. Depending upon the character of the liquid, it may be injected at a location between pins on the whipper and the chamber, at a location lying on a plane intersecting the pins on the whipper assembly, or at a pin location where it can be injected proximate to the whipper assembly.

From the preblend mixer section, the flow path extends outwardly with respect to the axis of the whipper assembly and is defined between conical surfaces between the whipper assembly and the chamber. The cross-sectional area of the flow path increases between the conical surfaces and enters into a larger diameter, annular flow passage. Midway along the conically formed path, an inlet port of isocyanate is provided which is perpendicular or normal to a line along the conical surface of the chamber. In the larger diameter annular flow path there are four longitudinal rows of mixing pins which are equidistantly spaced about a circumference and respectively disposed on the chamber and on the whipper assembly. The pins alternate along the length of the chamber respectively between positions on the whipper assembly and positions on the chamber. On the whipper assembly a first set of pins has a parallelogram cross-section arranged to alternate lengthwise between opposite directions of inclination, so that adjacent blades have alternately converging and diverging facing surfaces. This arrangement provides for violent mixing. Near the end of the blade section, an alternate inlet port is provided in a chamber pin for the injection of a blowing agent, if desired or necessary.

Following the blade section, the pins are cylindrical in cross-section on the whipper assembly. The next section of pins on the whipper assembly are square shaped but have a diagonal dimension arranged parallel to the axis of the whipper body. The final section of pins are square shaped with two sides parallel to the axis of the whipper assembly. The effect of the different pin configurations is to selectively increase the whipping and mixing action.

Following the pin sections, the flow path converges from a larger cross-section to a smaller cross-section of annular flow path and passes to a cylindrical discharge opening. With respect to the pin section along the whipper, a number of horizontal sets of pins on the whipper assembly include eight pins to increase the mixing action at that particular section.

With respect to a second embodiment, selectively controlled valves are employed between the premixing and mixer sections and between the mixer section and the discharge outlet. The use of such valves gives control over the pressure in the flow passage in the mixer. This then permits use of a wide variety of formulations which may require different back pressures. In addition, a porous spreading means is useful with the discharge nozzle to disperse the mixed liquids without splattering onto a conveyor or into a mold.

One of the particular advantages of the mixer is its versatility in that it can be driven with sufficient horsepower and at speeds which will mix polyesters and polyether-type mixtures without requiring high pressure injection systems for mixing. By use of the selectively controlled valves, the back pressure is controlled so that the pressure gradient in the head is controlled and so that the degree of Freon gaseous nucleation and/or dispersion is controlled, thereby avoiding the creation of abnormal bubbles in the mix. It will be appreciated that with the common mixing of substantially all of the components, during the production a very close control can be exercised over the inputs to obtain the desired product without undue delay. Because the mixer imparts heat into the mixture, less catalyst is necessary and the control is much more positive. Also, there is less chance for undesirable side reactions to occur in the preblended mixture.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus for continuous manufacture of polyurethane by mixing of components comprising:
   a housing having a hollow interior and a lower discharge nozzle,
   a whipper assembly disposed in said housing and mounted for rotation relative to said housing, the interior of said housing and said whipper assembly defining therebetween a continuous flow path along the length of said housing,
   first inlet means in the upper end of said housing for supplying a polyfunctional hydroxyl material to said flow path,
   second inlet means disposed circumferentially and longitudinally below said first inlet means for supplying to said flow path additional chemical components for preblending with said polyfunctional hydroxyl material,
   means for transversely shearing said polyfunctional hydroxy material and mixing said additional chemical components into said polyfunctional hydroxyl material by transverse shearing along a length of flow path coextensive with said second inlet means, to provide a preblended polyfunctional hydroxyl mixture.

third inlet means for supplying an isocyanate to said preblended mixture in said flow path, said third inlet means being located below said second inlet means, means for transversely shearing and mixing said preblended hydroxyl mixture and isocyanate along a length of said flow path, and means provided between said second and third inlet means for restricting the flow of liquids along said flow path.

2. The apparatus of claim 1 wherein said restricting means also includes means for defining an expanding cross-sectional area for said flow path and said third inlet means opens into said area.

3. The apparatus of claim 1 wherein said nozzle includes valve means for restricting the flow of liquids therethrough.

4. The apparatus of claim 1 wherein said restricting means comprise valve means to vary the degree of restriction.

5. The apparatus of claim 1 wherein there is provided means for rotatably supporting said whipper assembly at its lower end in said nozzle including equidistantly spaced support arms with the axis through the major dimension of said arms aligned with the swirl angle of the liquid.

6. The apparatus of claim 5 wherein said support arms are connected to a central fairing member, said fairing member having a portion thereof rotatably mounted within the end of said whipper means, and means for sealing said fairing member portion relative to said whipper means.

7. The apparatus of claim 5 wherein said support arms are connected to a central fairing member, said fairing member having an outer ogive configuration.

8. The apparatus of claim 1 wherein said discharge nozzle has an outwardly flared section terminating along a plane arranged to parallel the plane of deposit of the mixed polyurethane components.

9. The apparatus of claim 8 wherein said flared section has a closure member comprised of a supporting mesh and filter means.

10. Apparatus for continuous manufacture of urethane by continuous mixing of liquid components comprising a mixer assembly having a hollow housing a lower discharge nozzle, and an interior, rotatably supported whipper assembly, said whipper assembly and housing defining therebetween a flow passage, said flow passage having sequentially arranged cross-sections along its length which respectively are expanding, constant, contracting, expanding, constant and contracting, means for supplying a polyfunctional hydroxyl liquid material to said above, first-mentioned expanding cross-section, means for supplying additional chemical components to said above, second-mentioned constant cross-section, means for supplying an isocyanate to said above, fourth-mentioned expanding cross-section, and means disposed in said flow path and on said housing and whipper assembly for transversely shearing liquids along said flow path, said shearing means in said flow path for said polyfunctional hydroxyl material and additional chemical components being constructed for increasing the turbulence of the mixing along said flow path, said shearing means in said flow path for said isocyanate and mixture of polyfunctional hydroxyl material and additional chemical components being constructed for, sequentially along the flow path, increasing the turbulence, decreasing the turbulence and increasing the turbulence between said above mentioned fourth expanding area and said above sixth mentioned contracting area.

11. The apparatus of claim 10 wherein said shearing means in said flow path for said polyfunctional material and additional chemical components includes, in descending order, cylindrically shaped pins, square shaped pins with diagonals arranged parallel to the axis of the whipper assembly, and square shaped pins with sides arranged parallel to the axis of the whipper assembly.

12. The apparatus of claim 10 wherein said shearing means in said flow path for said isocyanate and mixture of polyfunctional hydroxyl material and additional chemical components includes, in descending order, inclined blade members, cylindrically shaped pins, square shaped pins with diagonals arranged parallel to the axis of the whipper assembly and square shaped pins with sides arranged parallel to the axis of the whipper assembly.

13. The apparatus of claim 12 wherein said blade members are in longitudinally spaced rows and wherein the angle of inclination of adjacent blades is alternated.

14. Apparatus for continuous manufacture of urethane by continuous mixing of liquid components comprising mixer means having a hollow housing, a lower discharge nozzle and an interior, rotatably supported whipper means, said whipper means and said housing defining a longitudinally extending flow passage, said flow passage having a first section of increasing cross-sectional area, a second section of constant cross-sectional area, a third section of decreasing cross-sectional area, a fourth section of increasing cross-sectional area, a fifth section of constant cross-sectional area and a sixth section of decreasing cross-sectional area, pin means alternating along the length of said flow passage between positions on said housing and said whipper means, said first section including pins having a cylindrical cross-section, said second section including pins having a square shape with diagonals arranged parallel to the axis of said whipper means and pins having a square shape with sides parallel to the axis of said whipper means, said fifth section including pins having a parallelogram cross-section, cylindrically shaped pins, square shaped pins with diagonals arranged parallel to the axis of said whipper means and pins having square shape with sides parallel to the axis of said whipper means, inlet means for supplying a chemical component to said first section, inlet means for supplying different chemical components at different circumferential locations to said second section, and inlet means for supplying another chemical component to said fourth section.

15. The apparatus of claim 15 wherein said flow passage includes an annular passage preceding said first section and port means to said annular passage, said first section being defined by a conical taper on the inner wall of said housing having an angle with respect to the vertical between 15° and 20° and a conical taper on said whipper means having an angle with respect to the vertical between 13.5° and 19°.

16. The apparatus of claim 15 wherein said fourth and sixth sections having conical tapers within the ranges specified in claim 15.

17. Apparatus for continuous manufacture of polyurethane by mixing of components comprising elongated mixer means having a continuous flow passage and lower discharge nozzle, said mixer means being comprised of upper and lower sections, the major portion of said flow passage in said upper and lower sections having substantially uniform cross-section, means coupling said upper and lower sections to one another and having a flow path therethrough of a reduced cross-section relative to that of said flow path in said upper and lower sections, transverse agitating means along the major portions of said flow passage for transversely shearing liquid passing therethrough, and inlet means for supplying liquid reaction components to said flow passages at at least two locations in the upper section of said mixer means and at at least one location in the lower section of said mixer means.

18. The apparatus of claim 17 wherein said mixer means includes a central whipper shaft defining a part of said flow passage and carrying a part of said agitating means.

* * * * *